United States Patent
Marquette et al.

(10) Patent No.: US 12,202,974 B2
(45) Date of Patent: Jan. 21, 2025

(54) METHOD FOR MANUFACTURING A SILICONE ELASTOMER ARTICLE USING A 3D PRINTER

(71) Applicants: ELKEM SILICONES France SAS, Lyons (FR); Centre national de la recherche scientifique, Paris (FR); Université Claude Bernard Lyon 1, Villeurbanne (FR); Institut National des Sciences Appliquées LYON, Villeurbanne (FR)

(72) Inventors: Christophe Marquette, Villeurbanne (FR); Edwin-Joffrey Courtial, Villeurbanne (FR); Jean-Marc Frances, Meyzieu (FR)

(73) Assignees: ELKEM SILICONES FRANCE, Lyons (FR); CENTRE NATIONAL DE LA RECHERCHE SCIENTIFIQUE, Paris (FR); UNIVERSITÉ CLAUDE BERNARD LYON, Villeurbanne (FR); INSTITUT NATIONAL DES SCIENCES APPLIQUÉES LYON 1, Villeurbanne (FR)

( * ) Notice: Subject to any disclaimer, the term of this patent is extended or adjusted under 35 U.S.C. 154(b) by 643 days.

(21) Appl. No.: 17/053,969

(22) PCT Filed: May 7, 2019

(86) PCT No.: PCT/EP2019/061736
§ 371 (c)(1),
(2) Date: Nov. 9, 2020

(87) PCT Pub. No.: WO2019/215190
PCT Pub. Date: Nov. 14, 2019

(65) Prior Publication Data
US 2021/0238418 A1 Aug. 5, 2021

(30) Foreign Application Priority Data
May 9, 2018 (EP) .................................. 18305570

(51) Int. Cl.
| | |
|---|---|
| C08L 83/04 | (2006.01) |
| B29C 64/106 | (2017.01) |
| B29C 64/357 | (2017.01) |
| B29K 83/00 | (2006.01) |
| B33Y 10/00 | (2015.01) |
| B33Y 70/00 | (2020.01) |
| C08L 71/02 | (2006.01) |

(52) U.S. Cl.
CPC ............ C08L 83/04 (2013.01); B29C 64/106 (2017.08); B29C 64/357 (2017.08); B33Y 70/00 (2014.12); B29K 2083/00 (2013.01); B33Y 10/00 (2014.12); C08L 71/02 (2013.01); C08L 2312/00 (2013.01)

(58) Field of Classification Search
CPC ...... C08L 83/04; C08L 71/02; C08L 2312/00; B29C 64/106; B29C 64/357; B29C 64/364; B29C 64/40; B29C 64/124; B29C 64/295; B29C 64/379; B33Y 70/00; B33Y 10/00; B33Y 40/00; B29K 2083/00; B29K 2829/00; C08J 5/00
See application file for complete search history.

(56) References Cited

U.S. PATENT DOCUMENTS

| | | | |
|---|---|---|---|
| 6,569,955 B1 | 5/2003 | Brewer et al. | |
| 6,942,830 B2 | 9/2005 | Muelhaupt et al. | |
| 10,150,258 B2 | 12/2018 | Feinberg et al. | |
| 10,400,071 B2 | 9/2019 | Achenbach et al. | |
| 11,135,777 B2 | 10/2021 | Luo et al. | |

(Continued)

FOREIGN PATENT DOCUMENTS

| | | |
|---|---|---|
| CN | 103249567 | 8/2013 |
| CN | 107412853 | 12/2017 |

OTHER PUBLICATIONS

Wikipedia contributors. (Feb. 7, 2023). Phosphate-buffered saline. In Wikipedia, The Free Encyclopedia. Retrieved 18:04, May 26, 2023, from https://en.wikipedia.org/w/index.php?title=Phosphate-buffered_saline&oldid=1137952780 (Year: 2023).*
International Search Report for PCT/EP2019/061736 dated Jul. 29, 2019.
European Search Report for related application EP 18 30 5570 dated Nov. 5, 2018.

(Continued)

*Primary Examiner* — Michael M. Robinson
(74) *Attorney, Agent, or Firm* — B. Aaron Schulman, Esq.; Stites & Harbison, PLLC

(57) ABSTRACT

The present invention relates to a process for manufacturing a silicone elastomer article comprising the following step: 1) providing a composition C, comprising water and at least 20% by weight of at least one poloxamer, into a container; 2) placing the container comprising the composition C at the required temperature T1 to form a gel; 3) printing a cross-linkable silicone composition X into the gel obtained in 2) with a 3D printer at the required temperature T1; 4) optionally allowing the printed composition X to partially or totally crosslink, optionally by heating, to obtain a silicone elastomer article, into the container; 5) optionally placing the container obtained in step 4) at a temperature T3 lower than the sol-gel transition temperature of composition C; 6) recovering the silicone elastomer article; and 7) optionally washing the obtained silicone elastomer article for example with water at a temperature T3 lower than the sol-gel transition temperature of composition C.

17 Claims, No Drawings

(56) References Cited

U.S. PATENT DOCUMENTS

| | | |
|---|---|---|
| 2003/0090034 A1 | 5/2003 | Muelhaupt et al. |
| 2012/0116568 A1* | 5/2012 | Murphy .................. B41J 2/1752 414/754 |
| 2016/0068678 A1 | 3/2016 | Luo et al. |
| 2016/0074558 A1 | 3/2016 | Murphy et al. |
| 2016/0167312 A1* | 6/2016 | Feinberg ................. A61L 27/04 264/239 |
| 2018/0057682 A1 | 3/2018 | Angelini et al. |
| 2018/0066115 A1 | 3/2018 | Achenbach et al. |
| 2019/0291350 A1 | 9/2019 | Feinberg et al. |
| 2020/0131364 A1 | 4/2020 | Luo et al. |
| 2020/0330644 A1* | 10/2020 | MacQueen ............ B33Y 70/00 |

OTHER PUBLICATIONS

Bhattacharjee, et al., "Writing in the granular gel medium", Sep. 25, 2015, pp. 1-6, Science Advances, vol. 1 No. 8.

* cited by examiner

METHOD FOR MANUFACTURING A SILICONE ELASTOMER ARTICLE USING A 3D PRINTER

The present invention relates to a method for manufacturing a silicone elastomer article using a 3D-printer. The present invention also relates to the silicone elastomer article susceptible to be obtained by this method.

In 3D-printing, there is a huge impact of gravity and rheological and mechanical properties of the composition used for printing, notably for the manufacturing of complex article. Especially, low viscosity silicone compositions (<100000 mPa·s) can't be printed in classic atmosphere with "earth" gravity for simple or complex objects. Indeed, the rheological and mechanical properties of these silicones don't allow users to hold object during printing. Moreover, the atmospheric pressure and the surface tension make it difficult to give filament extrusion. For silicone formulations with medium or high viscosity (>100000 mPa·s), the printability depends on rheological and mechanical properties. However, it is not possible to print articles with a complex shape (i.e. article having overhang >60°, bridge or height >5 cm).

US20180057682 discloses the use of an organic microgel obtained by blending a diblock copolymer polystyrene-block ethylene/propylene (SEP) and a triblock copolymer polystyrene-block ethylene/butylene-block-polystyrene (SEBS) in mineral oil, as support material for 3D printing. The rheological properties of this organic microgel can be tuned, leveraging the jamming transition to facilitate its use in 3D printing of silicone structures. It is necessary to remove the cured part from the organic microgel support material by serially washing it with solvents (methanol) and surfactant solutions. The support material does not seem to be reusable.

It is also disclosed by Hinton et al. (Science Advances, 2015, Vol. 1, no. 8) a method to print silicone 3D objects by using three different gels: Carbopol 940, ETD 2020, and Ultrez 30 (Lubrizol), which are cross-linked acid acrylic polymers. Carbopol 940 gives best surface aspect. However, the Carbopol 940 is requiring an accurate pH and salt control which can be a limit to print different type of silicones. Contrary to the title of publication, the gel seems not be used anymore because Carbopol 940 is diluted with PBS (PolyButadiene/Styrene) solution to remove the printed silicone object after 15 minutes.

There is thus a need to provide a method for manufacturing silicone elastomer article using a 3D-printer and which can be handling with a great variety of silicone elastomer.

A first object of the present invention is thus to provide a method for manufacturing silicone elastomer articles using a 3D-printer and which can be used with a great variety of silicone compositions.

Another object of the present invention is to provide such a method which enables to manufacture complex shape articles, i.e. article having overhang >60°, bridge or height >5 cm.

All these objectives are fulfilled by the present invention which relates to a process for manufacturing a silicone elastomer article comprising the following steps:

1) providing a composition C, comprising water and at least 20% by weight of at least one poloxamer, into a container;
2) placing the container comprising the composition C at the required temperature T1 to form a gel;
3) printing a crosslinkable silicone composition X into the gel obtained in 2) with a 3D printer at the required temperature T1;
4) optionally allowing the printed composition X to partially or totally crosslink, optionally by heating, to obtain a silicone elastomer article, in the container;
5) optionally placing the container obtained in step 4) at a temperature T3 lower than the sol-gel transition temperature of composition C;
6) recovering the silicone elastomer article; and
7) optionally washing the obtained silicone elastomer article, for example with water at a temperature T3 lower than the sol-gel transition temperature of composition C.

The poloxamer must be non-compatible with the silicone elastomer, i.e. there is no interpenetration between the poloxamer and the silicone elastomer. This advantageously enables to obtain a good surface roughness of the silicone article manufactured, i.e. a roughness less than 100 nm.

Moreover, the poloxamer shall be removed without polluting the silicone surface of the article.

According to the present invention, a poloxamer is a copolymer composed of poly(propylene oxide) (PO) and poly(ethylene oxide) (EO) block also named poly(propylene oxide) poly(ethylene oxide) block copolymer. Preferably, a poloxamer according to the invention is a triblock copolymer composed of a central PO block and two terminal EO block also named poly(ethylene oxide) poly(propylene oxide) poly(ethylene oxide) block copolymer, i.e the poloxamer according to the invention is preferably of the type EO-PO-EO triblock copolymer.

An important characteristic of poloxamer is that they form gel with water in a sol-gel transition temperature process. At sol-gel transition temperature the rheological properties of a composition changes from a liquid-like state to a solid-like state. Aqueous solutions of poloxamers are liquid at low temperature and form a gel at higher temperature in a thermoreversible process. The transitions that occur in these systems depend on the poloxamer and its concentration. In the present invention, temperature T1 corresponds to the temperature at which the composition C forms a gel and temperature T3 is the temperature below which the gel formed with the composition C at step 2 liquefies.

Preferably, in the present invention, the poloxamer composition C is solid at ambient temperature, i.e at a temperature between 20 and 30° C. and liquid at lower temperature, i.e. at temperature below 15° C. Preferably, in the present invention, the poloxamer is composed of poly(propylene oxide) (PO) and poly(ethylene oxide) (EO) block. Preferably, the poloxamer of the invention is a triblock copolymer composed of a central PO block and two terminal EO blocks, and comprise from 25 to 90% by weight of EO units based on the total weight of the poloxamer, preferably from 30 to 80% by weight of EO units based on the total weight of the poloxamer, preferably from 50 to 75%, by weight of EO units based on the total weight of the poloxamer.

More preferably, the poloxamer according to the invention is a triblock copolymer composed of a central PO block and two terminal EO blocks for which the two EO blocks comprise each between 20 and 300 repeat units, preferably between 50 and 150 repeat units and the PO block comprises between 10 and 100 repeat units, preferably between 30 and 70 repeat units.

Advantageously, the poloxamer of the invention is a triblock copolymer composed of a central PO block and two terminal EO blocks with 70%+/−2% by weight of EO units.

In a preferred embodiment, the poloxamer according to the invention is a triblock copolymer composed of a central PO block and two terminal EO blocks where the two EO blocks comprise each 100+/−10 repeat units and the PO block comprise 55+/−10 repeat units.

Such poloxamer is for example sold under the name Pluronic F127® by BASF.

Moreover, poloxamer and especially Pluronic F127® are biocompatible and thus can be used to prepare article for biological or medical uses.

Without to be bound by any theory, the gel formed from composition C acts as a constrained environment which enables to print low viscous crosslinking compositions X to further obtain silicone elastomer articles. Indeed, the gel formed from composition C applies a constant pressure to the crosslinking composition X during printing which enables to avoid any droop of the material. The pressure applied may be measured with a rheological characterization (shear stress in function of shear rate) using yield stress parameters Bingham fluid, the range of yield stress is preferably between 1 and 10 kPa.

Advantageously, the gel formed from composition C is self-healing. This advantageously allows a printing nozzle to repeatedly pass through the gel in the same area while the gel is simultaneously supporting the printed structure.

Preferably, the composition C comprises from 20 to 40%, more preferably from 20 to 30% and even more preferably from 20 to 25%, by weight of at least one poloxamer and preferably at least one poloxamer such as described above. Advantageously, the composition C comprises from 21.5 to 22.5% by weight of a poloxamer based on the total weight of composition C.

Advantageously, in order to provide a functionalization of the surface of the silicone elastomer article obtained by the method of the invention, the composition C can further comprise one or more compounds chosen among:
- a base, for example NaOH;
- an acid, for example acetic acid;
- a functionalized silane, for example with amino, epoxy, hydroxy, polyether (especially stable at pH comprised between 4 and 5) groups.

In step 1, composition C has to be placed at a temperature T1 enabling to form a gel. The skilled person can determine the temperature range based on its general knowledge and based on the poloxamer used. Preferably, T1 is comprised between 20 and 50° C., preferably between 25 and 50° C., more preferably between 25 and 40° C., for example between 25 and 35° C. and even more preferably between 28 and 32° C.

In the process according to the invention, composition X is a crosslinkable silicone composition having preferably a viscosity comprised between 1000 mPa·s and 1000000 mPa·s. The process according to the invention is especially adapted to print a crosslinkable silicone composition X having a viscosity lower than 50000 mPa·s, preferably lower than 10000 mPa·s, for example comprised between 1000 to 5000 mPa·s.

All the viscosities under consideration in the present description correspond to a "Newtonian" dynamic viscosity magnitude at 25° C., i.e. the dynamic viscosity which is measured, in a manner that is known per se, with a Brookfield viscometer at a shear rate gradient that is low enough for the measured viscosity to be independent of the rate gradient.

The crosslinkable silicone composition X can be a silicone composition crosslinkable through addition reaction or through polycondensation reaction.

In one embodiment, the crosslinkable silicone composition X is a silicone composition crosslinkable through addition reaction. In this embodiment, the composition X comprises:
- (A) at least one organopolysiloxane compound A comprising, per molecule at least two $C_2$-$C_6$ alkenyl radicals bonded to silicon atoms,
- (B) at least one organohydrogenopolysiloxane compound B comprising, per molecule, at least two hydrogen atoms bonded to an identical or different silicon atom,
- (C) at least one catalyst Cat consisting of at least one metal or compound, from the platinum group,
- (D) optionally a filler D and
- (F) optionally a crosslinking inhibitor F.

Organopolysiloxane A

According to a particularly advantageous mode, the organopolysiloxane A comprising, per molecule, at least two $C_2$-$C_6$ alkenyl radicals bonded to silicon atoms, comprises:
(i) at least two siloxyl units (A.1), which may be identical or different, having the following formula:

$$W_a Z_b SiO_{\frac{4-(a+b)}{2}} \quad (A.1)$$

in which:
a=1 or 2, b=0, 1 or 2 and a+b=1, 2 or 3;
the symbols W, which may be identical or different, represent a linear or branched $C_2$-$C_6$ alkenyl group,
and the symbols Z, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals,
(ii) and optionally at least one siloxyl unit having the following formula:

$$Z^1_a SiO_{\frac{4-a}{2}} \quad (A.2)$$

in which:
a=0, 1, 2 or 3,
the symbols $Z^1$, which may be identical or different, represent a monovalent hydrocarbon-based group containing from 1 to 30 carbon atoms, preferably chosen from the group formed by alkyl groups containing from 1 to 8 carbon atoms inclusive and aryl groups containing between 6 and 12 carbon atoms, and even more preferentially chosen from the group formed by methyl, ethyl, propyl, 3,3,3-trifluoropropyl, xylyl, tolyl and phenyl radicals.

Advantageously, Z and $Z^1$ are chosen from the group formed by methyl and phenyl radicals, and W is chosen from the following list: vinyl, propenyl, 3-butenyl, 5-hexenyl, 9-decenyl, 10-undecenyl, 5,9-decadienyl and 6-11-dodecadienyl, and preferably, W is a vinyl.

In a preferably embodiment, in formula (A.1) a=1 and a+b=2 or 3 and in formula (A.2) c=2 or 3.

These organopolysiloxanes A may have a linear, branched or cyclic structure. Their degree of polymerization is preferably between 2 and 5000.

When they are linear polymers, they are essentially formed from siloxyl units D chosen from the group formed by the siloxyl units $W_2SiO_{2/2}$, $WZSiO_{2/2}$ and $Z^1{}_2 SiO_{2/2}$, and from siloxyl units M chosen from the group formed by the siloxyl units $W_3SiO_{1/2}$, $WZ_2SiO_{1/2}$, $W_2ZSiO_{1/2}$ and $Z^1{}_3 SiO_{1/2}$. The symbols W, Z and $Z^1$ are as described above.

As examples of end units M mention may be made of trimethylsiloxy, dimethylphenylsiloxy, dimethylvinylsiloxy or dimethylhexenylsiloxy groups.

As examples of units D, mention may be made of dimethylsiloxy, methylphenylsiloxy, methylvinylsiloxy, methylbutenylsiloxy, methylhexenylsiloxy, methyldecenylsiloxy or methyldecadienylsiloxy groups.

Said organopolysiloxanes A may be oils with a dynamic viscosity from about 10 to 1000000 mPa·s at 25° C., generally from about 1000 to 120000 mPa·s at 25° C.

When they are cyclic organopolysiloxanes, they are formed from siloxyl units D having the following formulae: $W_2SiO_{2/2}$, $Z_2SiO_{2/2}$ or $WZSiO_{2/2}$, which may be of the dialkylsiloxy, alkylarylsiloxy, alkylvinylsiloxy or alkylsiloxy type. Examples of such siloxyl units have already been mentioned above. Said cyclic organopolysiloxanes A have a viscosity from about 1 to 5000 mPa·s at 25° C.

Preferably, the organopolysiloxane compound A has a weight content of Si-vinyl units of between 0.001 and 30%, preferably between 0.01 and 10%.

Organohydrogenpolysiloxane B

According to a preferred embodiment, the organohydrogenopolysiloxane compound B is an organopolysiloxane containing at least two hydrogen atoms per molecule, bonded to an identical or different silicon atom, and preferably containing at least three hydrogen atoms per molecule directly bonded to an identical or different silicon atom.

Advantageously, the organohydrogenopolysiloxane compound B is an organopolysiloxane comprising:
(i) at least two siloxyl units and preferably at least three siloxyl units having the following formula:

 (B.1)

in which:
d=1 or 2, e=0, 1 or 2 and d+e=1, 2 or 3,
the symbols $Z^3$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals, and
(ii) optionally at least one siloxyl unit having the following formula:

 (B.2)

in which:
c=0, 1, 2 or 3,
the symbols $Z^2$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals.

The organohydrogenopolysiloxane compound B may be formed solely from siloxyl units of formula (B.1) or may also comprise units of formula (B.2). It may have a linear, branched or cyclic structure. The degree of polymerization is preferably greater than or equal to 2. More generally, it is less than 5000.

Examples of siloxyl units of formula (B.1) are especially the following units: $H(CH_3)_2SiO_{1/2}$, $HCH_3SiO_{2/2}$ and $H(C_6H_5)SiO_{2/2}$.

When they are linear polymers, they are essentially formed from:
siloxyl units D chosen from the units having the following formulae $Z^2{}_2 SiO_{2/2}$ or $Z^3HSiO_{2/2}$, and
siloxyl units M chosen from the units having the following formulae $Z^2{}_3 SiO_{1/2}$ or $Z^3{}_2HSiO_{1/2}$,
the symbols $Z^2$ and $Z^3$ are as described above.

These linear organopolysiloxanes may be oils with a dynamic viscosity from about 1 to 100000 mPa·s at 25° C., generally from about 10 to 5000 mPa·s at 25° C., or high viscous oils with a viscosity of about 1000000 mPa·s or more at 25° C.

When they are cyclic organopolysiloxanes, they are formed from siloxyl units D having the following formulae $Z^2{}_2 SiO_{2/2}$ and $Z^3HSiO_{2/2}$, which may be of the dialkylsiloxy or alkylarylsiloxy type or units $Z^3HSiO_{2/2}$ solely. They then have a viscosity from about 1 to 5000 mPa·s.

Examples of linear organohydrogenopolysiloxane compounds B are: dimethylpolysiloxanes bearing hydrogenodimethylsilyl end groups, dimethylhydrogenomethylpolysiloxanes bearing trimethylsilyl end groups, dimethylhydrogenomethylpolysiloxanes bearing hydrogenodimethylsilyl end groups, hydrogenomethylpolysiloxanes bearing trimethylsilyl end groups, and cyclic hydrogenomethylpolysiloxanes.

The oligomers and polymers corresponding to the general formula (B.3) are especially preferred as organohydrogenopolysiloxane compound B:

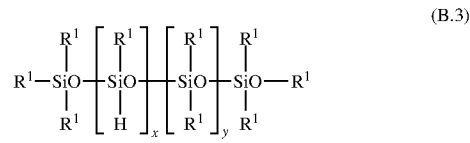 (B.3)

in which:
x and y are an integer ranging between 0 and 200,
the symbols $R^1$, which may be identical or different, represent, independently of each other:
a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl, a cycloalkyl radical containing between 5 and 8 cyclic carbon atoms,
an aryl radical containing between 6 and 12 carbon atoms, or
an aralkyl radical bearing an alkyl part containing between 5 and 14 carbon atoms and an aryl part containing between 6 and 12 carbon atoms.

The following compounds are particularly suitable for the invention as organohydrogenopolysiloxane compound B:

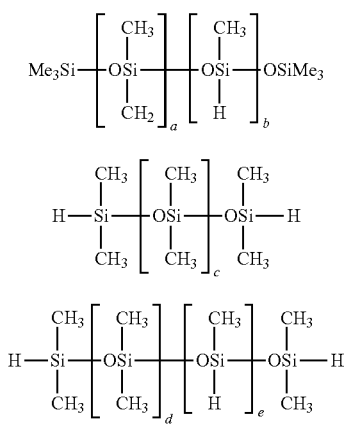

with a, b, c, d and e defined below:
in the polymer of formula S1:
$0 \leq a \leq 150$, preferably $0 \leq a \leq 100$, and more particularly $0 \leq a \leq 20$, and
$1 \leq b \leq 90$, preferably $10 \leq b \leq 80$ and more particularly $30 \leq b \leq 70$,
in the polymer of formula S2: $0 \leq c \leq 15$
in the polymer of formula S3: $5 \leq d \leq 200$, preferably $20 \leq d \leq 100$, and
$2 \leq e \leq 90$, preferably $10 \leq e \leq 70$.

In particular, an organohydrogenopolysiloxane compound B that is suitable for use in the invention is the compound of formula S1, in which a=0.

Preferably, the organohydrogenopolysiloxane compound B has a weight content of SiH units of between 0.2 and 91%, preferably between 0.2 and 50%.

In an embodiment, the organohydrogenopolysiloxane compound B is a branched polymer. Said branched organohydrogenopolysiloxane compound B comprises:
a) at least two different siloxyl units selected from siloxyl unit M of formula $R_3SiO_{1/2}$, siloxyl unit D of formula $R_2SiO_{2/2}$, siloxyl unit T of formula $RSiO_{3/2}$ and siloxyl unit Q of formula $SiO_{4/2}$, in which R denotes monovalent hydrocarbon group with 1 to 20 carbon atoms or an hydrogen atom, and
b) provided that at least one of these siloxyl units is siloxyl unit T or Q and at least one of siloxyl units M, D or T contains a Si—H group.

Thus, according to one preferable embodiment, the branched organohydrogenopolysiloxane compound B can be selected from the following groups:
organopolysiloxane resin of formula M'Q, which is essentially formed from:
(a) monovalent siloxyl unit M' of formula $R_2HSiO_{1/2}$; and
(b) tetravalent siloxyl unit Q of formula $SiO_{4/2}$; and
organopolysiloxane resin of formula MD'Q, which is basically constituted of the following units:
(a) divalent siloxyl unit D' of formula $RHSiO_{2/2}$;
(b) monovalent siloxyl unit M of formula $R_3SiO_{1/2}$; and
(c) tetravalent siloxyl unit Q of formula $SiO_{4/2}$;
wherein R represents monovalent hydrocarbyl having 1 to 20 carbon atoms, preferably represents monovalent aliphatic or aromatic hydrocarbyl having 1 to 12, more preferably 1 to 8 carbon atoms.

As a further embodiment, a mixture of at least a linear organohydrogenopolysiloxane compound B and at least a branched organohydrogenopolysiloxane compound B can be used. In this case, the linear and branched organohydrogenopolysiloxane compound B can be mixed in any proportion in a wide range, and the mixing proportion may be adjusted depending on the desired product properties such as hardness and the ratio of Si—H to alkenyl group.

In the context of the invention, the proportions of the organopolysiloxane A and of the organohydrogenopolysiloxane B are such that the mole ratio of the hydrogen atoms bonded to silicon (Si—H) in the organohydrogenopolysiloxane B to the alkenyl radicals bonded to silicon (Si—CH=CH$_2$) in the organopolysiloxane A is between 0.2 and 20, preferably between 0.5 and 15, more preferentially between 0.5 and 10 and even more preferentially between 0.5 and 5.

Catalyst Cat

Catalyst Cat consisting of at least one metal, or compound, from the platinum group are well known. The metals of the platinum group are those known under the name platinoids, this term combining, besides platinum, ruthenium, rhodium, palladium, osmium and iridium. Platinum and rhodium compounds are preferably used. Complexes of platinum and of an organic product described in U.S. Pat. Nos. 3,159,601, 3,159,602, 3,220,972 and European patents EP A 0 057 459, EP A 0 188 978 and EP A 0 190 530, and complexes of platinum and of vinylorganosiloxanes described in U.S. Pat. Nos. 3,419,593, 3,715,334, 3,377,432 and 3,814,730 may be used in particular. Specific examples are: platinum metal powder, chloroplatinic acid, a complex of chloroplatinic acid with β-diketone, a complex a chloroplatinic acid with olefin, a complex of a chloroplatinic acid with 1,3-divinyltetramethyldisiloxane, a complex of silicone resin powder that contains aforementioned catalysts, a rhodium compound, such as those expressed by formulae: RhCl(Ph$_3$P)$_3$, RhCl$_3$[S(C$_4$H$_9$)$_2$]$_3$, etc.; tetrakis(triphenyl) palladium, a mixture of palladium black and triphenylphosphine, etc.

The platinum catalyst ought preferably to be used in a catalytically sufficient amount, to allow sufficiently rapid crosslinking at room temperature. Typically, 1 to 200 ppm by weight of the catalyst are used, based in the amount of Pt metal, relative to the total silicone composition preferably 1 to 100 ppm by weight, more preferably 1 to 50 ppm by weight.

Filler D

To allow a sufficiently high mechanical strength the addition-crosslinking silicone compositions can comprise filler, such as for example silica fine particles, as reinforcing fillers D. Precipitated and fumed silicas and mixtures thereof can be used. The specific surface area of these actively reinforcing fillers ought to be at least 50 m$^2$/g and preferably in the range from 100 to 400 m$^2$/g as determined by the BET method. Actively reinforcing fillers of this kind are very well-known materials within the field of the silicone rubbers. The stated silica fillers may have hydrophilic character or may have been hydrophobized by known processes.

In a preferred embodiment, the silica reinforcing filler is fumed silica with a specific surface area of at least 50 m$^2$/g and preferably in the range from 100 to 400 m$^2$/g as determined by the BET method. Fumed silica may be used as is, in an untreated form, but is preferably subjected to hydrophobic surface treatment. In those cases, where a fumed silica that has undergone hydrophobic surface treatment is used, either a fumed silica that has been subjected to preliminary hydrophobic surface treatment may be used, or a surface treatment agent may be added during mixing of the fumed silica with the organopolysiloxane A, so that the fumed silica is treated in-situ.

The surface treatment agent may be selected from any of the conventionally used agents, such as alkylalkoxysilanes, alkylchlorosilanes, alkylsilazanes, silane coupling agents, titanate-based treatment agents, and fatty acid esters, and may use either a single treatment agent, or a combination of two or more treatment agents, which may be used either simultaneously or at different timings.

The amount of the silica reinforcing filler D in the addition-crosslinking silicone compositions is in the range from 5% to 40% by weight, preferably 10% to 35% by weight of the total composition. If this blend quantity is less than 5% by weight, then adequate elastomer strength may not be obtainable, whereas if the blend quantity exceeds 40% by weight, the actual blending process may become difficult.

The silicone compositions according to the invention may also comprise other fillers like a standard semi-reinforcing or packing filler, hydroxyl functional silicone resins, pigments, or adhesion promoters.

Non siliceous minerals that may be included as semi-reinforcing or packing mineral fillers can be chosen from the group constituted of: carbon black, titanium dioxide, aluminium oxide, hydrated alumina, calcium carbonate, ground quartz, diatomaceous earth, zinc oxide, mica, talc, iron oxide, barium sulfate and slaked lime.

Silicone resin denotes an organopolysiloxane comprising at least one T and/or one Q siloxy unit with Q: $SiO_{2/2}$ and T: $R1SiO_{3/2}$. The hydroxyl functional silicone resin are well known and can be chosen from MQ(OH), MDT(OH), or DT(OH) resins with M: $R1R2R3SiO_{1/2}$, D:$R1R2SiO2/2$, Q(OH): $(OH)SiO_{3/2}$, and T(OH): $(OH)R1SiO_{2/2}$, the R1, R2 and R3 groups being chosen independently of one another from:
  linear or branched alkyl groups having from 1 to 8 carbon atoms inclusive, optionally substituted by one or more halogen atoms; and
  aryl or alkylaryl groups containing from 6 to 14 carbon atoms inclusive.
Preferably, the hydroxyl functional silicone resin is a MQ(OH) resin.

Crosslinking Inhibitor F

Crosslinking inhibitors are commonly used in addition crosslinking silicone compositions to slow the curing of the composition at ambient temperature. The crosslinking inhibitor F may be chosen from the following compounds:
  acetylenic alcohols.
  organopolysiloxanes substituted with at least one alkenyl that may optionally be in cyclic form, tetramethylvinylcyclotetrasiloxane being particularly preferred,
  pyridine,
  organic phosphines and phosphites,
  unsaturated amides, and
  alkyl or alkenyl maleates.
These acetylenic alcohols (see FR-B-1 528 464 and FR-A-2 372 874), which are among the preferred hydrosilylation-reaction thermal blockers, have the formula:

in which: R' is a linear or branched alkyl radical, or a phenyl radical; and —R" is H or a linear or branched alkyl radical, or a phenyl radical; the radicals R' and R" and the carbon atom α to the triple bond possibly forming a ring.

The total number of carbon atoms contained in R' and R" being at least 5 and preferably from 9 to 20. For the said acetylenic alcohols, examples that may be mentioned include:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
2-methyl-3-butyn-2-ol;
3-methyl-1-pentadecyn-3-ol; and
diallyl maleate or diallyl maleate derivatives.

In a preferred embodiment, the crosslinking inhibitor is 1-ethynyl-1-cyclohexanol To obtain a longer working time or "pot life", the quantity of the inhibitor is adjusted to reach the desired "pot life". The concentration of the catalyst inhibitor in the present silicone composition is sufficient to slow curing of the composition at ambient temperature. This concentration will vary widely depending on the particular inhibitor used, the nature and concentration of the hydrosilylation catalyst, and the nature of the organohydrogenopolysiloxane. Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for an inhibitor in a given silicone composition can be readily determined by routine experimentation.

Advantageously, the amount of the crosslinking inhibitor F in the addition-crosslinking silicone compositions is in the range from 0.01% to 0.2% weight, preferably from 0.03% to 0.15% weight with respect to the total weight of the silicone composition.

The use of the inhibitor is effective to avoid the premature curing of the silicone composition on the tip of the nozzle and subsequent disfiguration of the printed layer.

Optionally, the silicone composition X can further comprise a thixotropic agent. The thixoropic agent can be an organopolysiloxane-polyoxyalkylene copolymer F.

Organopolysiloxane-polyoxyalkylene copolymer F, also known as polydiorganosiloxane-polyether copolymers or polyalkylene oxide modified polymethylsiloxane, are organopolysiloxanes containing siloxyl units which carry alkylene oxide chain sequences. Preferably, organopolysiloxane-polyoxyalkylene copolymer F are organopolysiloxanes containing siloxyl units which carry ethylene oxide chain sequences and/or propylene oxide chain sequences.

In a preferred embodiment the organopolysiloxane-polyoxyalkylene copolymer F is an organopolysiloxane containing siloxyl comprising units of the formula (F-1):

in which
each $R^1$ is independently selected from hydrocarbon-based group containing from 1 to 30 carbon atoms, preferably chosen from the group formed by alkyl groups containing from 1 to 8 carbon atoms and aryl groups containing between 6 and 12 carbon atoms;
each Z is a group $—R^2—(OC_pH_{2p})_q(OC_rH_{2r})_s—OR^3$, where
n is an integer greater than 2;
a and b are independently 0, 1, 2 or 3; and a+b=0, 1, 2 or 3,
$R^2$ is a divalent hydrocarbon group having from 2 to 20 carbon atoms or a direct bond;

$R^3$ is an hydrogen atom or a group as defined for $R^1$;
p and r are independently an integer from 1 to 6;
q and s are independently 0 or an integer such that $1 < q+s < 400$;
and wherein each molecule of the organopolysiloxane-polyoxyalkylene copolymer E contains at least one group Z.

In a preferred embodiment, in the formula (F-1) above:
n is an integer greater than 2; and a+b=0, 1, 2 or 3,
a and b are independently 0, 1, 2 or 3;
$R^1$ is an alkyl group containing from 1 to 8 carbon atoms inclusive, and most preferably $R^1$ is a methyl group,
$R^2$ is a divalent hydrocarbon group having from 2 to 6 carbon atoms or a direct bond;
p=2 and r=3,
q is comprised between 1 and 40, most preferably between 5 and 30,
s is comprised between 1 and 40, most preferably between 5 and 30,
and $R^3$ is an hydrogen atom or an alkyl group containing from 1 to 8 carbon atoms inclusive, and most preferably $R^3$ is an hydrogen atom.

In a most preferred embodiment, the organopolysiloxane-polyoxyalkylene copolymer F is an organopolysiloxane containing a total number of siloxyl units (F-1) comprised 1 and 200, preferably between 50 and 150 and a total number of Z groups comprised between 2 and 25, preferably between 3 and 15.

An example of organopolysiloxane-polyoxyalkylene copolymer F that can be used in the method of the invention corresponds to the formula (F-2)

         (F-2)

where
each $R^a$ is independently selected from alkyl groups containing from 1 to 8 carbon atoms and preferably $R^a$ is a methyl group,
each $R^b$ is a divalent hydrocarbon group having from 2 to 6 carbon atoms or a direct bond, and preferably $R^b$ is a propyl group,
x and y are independently integers comprised from 1 to 40, preferably from 5 and 30, and most preferably from 10 to 30,
t is comprised from 1 to 200, preferably from 25 to 150,
r is comprised from 2 to 25, preferably from 3 to 15, and
$R^c$ is H or alkyl group preferentially H or $CH_3$ group.

Advantageously, in an embodiment the organopolysiloxane-polyoxyalkylene copolymer F is:

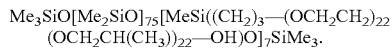

Methods of preparing polydiorganosiloxane-polyoxyalkylene copolymers are well known in the art. For example, a polydiorganosiloxane-polyoxyalkylene copolymer can be prepared using a hydrosilylation reaction by reacting, for example, a polydiorganosiloxane containing silicon-bonded hydrogen atoms with a polyoxyalkylene containing groups having aliphatic unsaturation in the presence of a platinum group catalyst.

The amount of organopolysiloxane-polyoxyalkylene copolymer F in the addition-crosslinking silicone compositions is at least 0.3% weight, preferably at least 0.4% weight, most preferably in the range from 0.6% to 4% weight, and even most preferably from 0.6% to 3% weight with respect to the total weight of the silicone composition.

In a preferably embodiment, the crosslinkable silicone composition X of the invention comprises, per 100% weight of the silicone composition:
from 55 to 80% weight of at least one organopolysiloxane compound A;
from 0.1 to 5% weight of at least one organohydrogenopolysiloxane compound B;
from 0 to 20% weight of at least one filler, preferably reinforcing silica filler D;
from 0.002 to 0.01% weight of platinum and
from 0.01 to 0.2% weight of at least one crosslinking inhibitor E.

The composition can be a one-part composition comprising components A to E in a single part or, alternatively, a multi-part composition comprising these components in two or more parts, provided components B, and Cat are not present in the same part. For example, a multi-part composition can comprise a first part containing a portion of component A and all of component Cat, and a second part containing the remaining portion of component A and all of component B. In certain embodiments, component A is in a first part, component B is in a second part separate from the first part, and component Cat is in the first part, in the second part, and/or in a third part separate from the first and second parts. Components D, and E may be present in a respective part (or parts) along with at least one of components B, or Cat, and/or can be in a separate part (or parts).

The one-part composition is typically prepared by combining the principal components and any optional ingredients in the stated proportions at ambient temperature. Although the order of addition of the various components is not critical if the composition is to be used immediately, the hydrosilylation catalyst is typically added last at a temperature below about 30° C. to prevent premature curing of the composition.

Also, the multi-part composition can be prepared by combining the components in each part. Combining can be accomplished by any of the techniques understood in the art such as, blending or stirring, either in a batch or continuous process in a particular device. The particular device is determined by the viscosity of the components and the viscosity of the final composition.

In certain embodiments, when the silicone compositions are multipart silicone compositions, the separate parts of the multi-part silicone composition may be mixed in a dispense printing nozzle, e.g. a dual dispense printing nozzle, prior to and/or during printing. Alternatively, the separate parts may be combined immediately prior to printing.

In another embodiment, the crosslinkable silicone composition X is a silicone composition crosslinkable through polycondensation reaction which are well known by the skilled person. In this embodiment, the composition X comprises:
at least one organopolysiloxane G comprising at least two groups chosen in the group consisting of OH groups and hydrolysable groups,
a polycondensation catalyst,
optionally at least one crosslinking agent H and
optionally a filler D as disclosed before.

Preferably, the organopolysiloxane G comprises at least two groups chosen in the group consisting of: hydroxy, alcoxy, alcoxy-alkylene-oxy, amino, amido, acylamino, aminoxy, iminoxy, cetiminoxy, acyloxy and enoxy groups.

Advantageously, polyorganosiloxane G comprises:
(i) at least two siloxyl units of formula (V):

  (V)

in which:
R¹, identical or different, represent monovalents hydrocarbon radicals comprising from 1 to 30 carbon atoms;
Y, identical or different, represent each an hydrolysable and condensable group or a hydroxy group, and are preferably chosen in the group consisting of hydroxy, alkoxy, alcoxy-alkylene-oxy, amino, amido, acylamino, aminoxy, iminoxy, cetiminoxy, acyloxy, iminoxy, cetiminoxy and enoxy group,
g is 0, 1 or 2, h is 1, 2 or 3, the sum g+h is 1, 2 or 3, and
(ii) optionally one or more siloxyl unit(s) of formula (VI):

  (VI)

in which:
R², identical or different, represent monovalents hydrocarbon radicals comprising from 1 to 30 carbon atoms optionally substituted by one or more halogen atoms or by amino, ether, ester, epoxy, mercapto or cyano groups, and
i is 0, 1, 2 or 3.

As example of hydrolysable and condensable group Y of alkoxy type it is possible to cite groups having from 1 to 8 carbon atoms such as methoxy, ethoxy, n-propoxy, isopropoxy, n-butoxy, iso-butoxy, sec-butoxy, tert-butoxy, 2-méthoxyéthoxy, hexyloxy or octyloxy.

As example of hydrolysable and condensable group Y of alcoxy-alkylene-oxy type, it is possible to cite methoxy-ethylene-oxy.

As example of hydrolysable and condensable group Y of amino type, it is possible to cite methylamino, dimethylamino, ethylamino, diethylamino, n-butylamino, sec-butylamino or cyclohexylamino.

As example of hydrolysable and condensable group Y of amido type, it is possible to cite N-methyl-acetamido.

As example of hydrolysable and condensable group Y of acylamino type, it is possible to cite benzoyl-amino.

As example of hydrolysable and condensable group Y of aminoxy type, it is possible to cite dimethylaminoxy, diethylaminoxy, dioctylaminoxy ou diphenylaminoxy.

As example of hydrolysable and condensable group Y of iminoxy and in particular cétiminoxy type, it is possible to cite groups derived from the following oximes: acetophenone-oxime, acetone-oxime, benzophenone-oxime, methylethyl-cetoxime, di-isopropylcetoxime ou methylisobutyl-cetoxime.

As example of hydrolysable and condensable group Y of acyloxy type, it is possible to cite acetoxy.

As example of hydrolysable and condensable group Y of enoxy type, it is possible to cite 2-propenoxy.

The viscosity of the organopolysiloxane G is generally comprised between 50 mPa·s and 1000000 mPa·s at 25° C.

Preferably, organopolysiloxane G is of formula (VII):

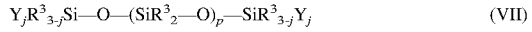  (VII)

In which:
Y, identical or different, represent each an hydrolysable and condensable group or a hydroxy group, and preferably are chosen in the group consisting of hydroxy, alkoxy, alkoxy-alkylene-oxy, amino, amido, acylamino, aminoxy, iminoxy, cetiminoxy, acyloxy and enoxy,
R³, identical or different, represent monovalent hydrocarbon radical comprising from 1 to 30 carbon atoms and optionally substituted by one or more halogen atoms or amino, ether, ester, epoxy, mercapto or cyano groups,
j is 1, 2 or 3, preferably is 2 or 3, and when Y is a hydroxyl group then j=1,
p is an integer equal or greater than 1, preferably p is an integer comprised between 1 and 2000.

In formula (V), (VI) and (VII), R¹, R² and R³ are preferably:
alkyl radicals comprising from 1 to 20 carbon atoms, optionally substituted by one or more aryl or cycloalkyl groups, by one or more halogen atoms or by amino, ether, ester, epoxy, mercapto, cyano or (poly)glycol groups. For example methyl, ethyl, propyl, isopropyl, butyl, pentyl, hexyl, ethyl-2 hexyl, octyl, decyl, trifluoro-3,3,3 propyl, trifluoro-4,4,4 butyl, pentafluoro-4,4,4,3,3 butyl;
cycloalkyl and halogenocycloalkyl groups comprising from 5 to 13 carbon atoms such as cyclopentyl, cyclohexyl, methylcyclohexyl, propylcyclohexyl, difluoro-2,3 cyclobutyl, difluoro-3,4 methyl-5 cycloheptyl;
aryl and halogenoaryl mononuclear comprising from 6 to 13 carbon atoms such as: phenyle, tolyle, xylyle, chlorophenyle, dichlorophenyle, trichlorophenyle; or
alcenyl radicals comprising from 2 to 8 carbon atoms such as: vinyl, allyl and butene-2 yl.

In the particular embodiment when G is of formula (VII) with Y of hydroxyl type, thus d is preferably 1. In this case, it is preferably to use poly(dimethylsiloxane) having terminal silanols groups (also called «alpha-omega» position).

Organopolysiloxane G can also be chosen in the group consisting of organopolysiloxane resins carrying at least one hydroxy or alkoxy group, groups which are either condensable or hydrolysable, which comprise at least two different siloxyl units chosen among groups of formula M, D, T and Q with:

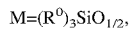

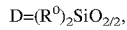

, et

;

formula in which R⁰ represents a monovalent hydrocarbon group comprising from 1 to 40 carbon atoms, and preferably from 1 to 20 carbon atoms, or a group —OR''' with R'''=H or an alkyl radical comprising from 1 to 40 carbon atoms, and preferably from 1 to 20 carbon atoms; with the condition that the resins comprise at least one motif T or Q unit.

Said resin has preferably a weight content of hydroxy or alcoxy substituents comprised between 0.1 and 10% by weight with respect to the weight of the resin, and preferably a weight content of hydroxy or alcoxy substituents comprised between 0.2 and 5% by weight with respect to the weight of the resin.

The organopolysiloxane resins have generally about 0.001 to 1.5 OH groups and/or alkoxyl per silicium atom. These organopolysiloxane resins are generally prepared by co-hydrolysis and co-condensation of chlorosilanes such as the ones of formula (R¹⁹)₃SiCl, (R¹⁹)₂Si(Cl)₂, R¹⁹Si(Cl)₃ or Si(Cl)₄, radicals R¹⁹ are identical or different and are in the group consisting of linear or branched alkyl in $C_1$ to $C_6$, phenyl and trifluoro-3,3,3 propyl. For example $R^{19}$ is methyl, ethyl, isopropyle, tertiobutyl and n-hexyl.

Examples of resins are silicic resins of T(OH), $DT^{(OH)}$, $DQ^{(OH)}$, $DT^{(OH)}$, $MQ^{(OH)}$, $MDT^{(OH)}$, $MDQ^{(OH)}$ type or a mixture.

In this second embodiment, the silicone composition crosslinkable through polycondensation reaction can further comprise such crosslinking agent H. It is preferably an organosilicium compound carrying per molecule more than 2 hydrolysable and condensable groups linked to the silicium atoms. Such agents are well known from the skilled person and are commercially available.

The crosslinking agent H is preferably a silicium compound whose each molecule comprises at least 3 hydrolysable and condensable Y groups, said agent H having formula (VIII):

$$R^4_{(4-k)}SiY_k \quad (VIII)$$

In which:
R$^4$ radicals, identical or different, represent monovalent hydrocarbon radicals in $C_1$ to $C_{30}$,
Y, identical or different, are chosen in the group consisting of alkoxy, alkoxy-alkylene-oxy, amino, amido, acylamino, aminoxy, iminoxy, cetiminoxy, acyloxy or enoxy groups, and preferably Y is an alcoxy, acyloxy, enoxy, cetiminoxy or oxime group,
k=2, 3 or 4, preferably k=3 or 4.

Examples of Y groups are the same as the ones cited for G above when Y is an hydrolysable and condensable group.

Other examples of crosslinking agent H, are alkoxysilanes and partial hydrolysis products of silane of formula (IX):

$$R^5_lSi(OR^6)_{(4-l)} \quad (IX)$$

in which:
R$^6$, identical or different, represent alkyl radical comprising from 1 to 8 carbon atoms such as methyl, ethyl, propyl, butyl, pentyl, ethyl-2 hexyl, octyl and decyl, oxyalkylenes groups in $C_3$-$C_6$,
R$^5$, identical or different, represent a saturated or unsaturated, linear or branched aliphatic hydrocarbon group, carbocycle group, saturated or unsaturated and/or aromatic, monocycle or polycycle, and l is 0, 1 or 2.

Among crosslinking agent H, alcoxysilanes, cetiminoxysilanes, alkyl silicates and alkyl polysilicates, in which the organic radicals are alkyl radical shaving from 1 to 4 carbon atoms are preferred.

Preferably, the following crosslinking agent H, are used alone or in mixture:
ethyl polysilicate and n-propyl polysilicate;
alkoxysilanes such as dialkoxysilanes, for example dialkyldialkoxysilanes, trialkoxysilanes, for example alkyltrialkoxysilanes, and tetraalkoxysilanes, preferably propyltrimethoxysilane, methyltrimethoxysilane, methyltriethoxysilane, ethyltrimethoxysilane, ethyltriethoxysilane, isobutyltrimethoxysilane, isobutyltriethoxysilane, propyltriethoxysilane, tetramethoxysilane, tetraethoxysilane, tetrapropoxysilane, tetrabutoxysilane, 1,2-bis(trimethoxysilyl)ethane, 1,2-bis(triethoxysilyl)ethane, tetra-isopropoxysilane, phenyltriethoxysilane, phenyltrimethoxysilane, vinyltriethoxysilane, vinyltrimethoxysilane and those of following formula: $CH_2=CHSi(OCH_2CH_2OCH_3)_3$, $Si(OC_2H_4OCH_3)_4$ and $CH_3Si(OC_2H_4OCH_3)_3$,
acyloxysilanes such as the following acetoxysilanes: tetraacetoxysilane, methyl-triacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyldiacetoxysilane and tetraacetoxysilane,
silanes comprising alkoxy and acetoxy groups such as: methyl-diacetoxymethoxysilane, methylacetoxydimethoxysilane, vinyldiacetoxy-methoxysilane, vinylacetoxydimethoxysilane, methyldiacetoxyethoxysilane and methylacetoxydiethoxysilane,
methyltris(methylethyl-cetoximo)silane, 3-cyanopropyltrimethoxysilane, 3-cyanopropyl-triethoxysilane, 3-(glycidyloxy)propyltriethoxysilane, vinyl-tris(methylethylcetoximo)silane, tetra-kis(methylethylcetoximo)silane.

Generally from 0.1 to 60 parts by weight of crosslinking agent H are used for 100 parts by weight of polyorganosiloxane G. Preferably, 0.5 to 15 parts by weight of crosslinking agent H are used for 100 parts by weight of polyorganosiloxane G.

Crosslinkable silicone composition X (either by polycondensation or polyaddition) can further comprise functional additives usual in silicone composition. The following functional families of additives can be cited:
adhesion promoter;
silicon resins;
thixotropic agents,
color agent and
additives for thermal resistance, oil resistance and fire resistance, for example metallic oxides.

The polycondensation catalyst can be a tin, zinc, iron, zirconium, bismuth or titanium derivative or an organic compounds as amine or guanidines as disclosed for example in EP2268743 and EP2222688. Use may be made, as tin-derived condensation catalyst, of tin monocarboxylates and dicarboxylates, such as tin 2-ethylhexanoate, dibutyltin dilaurate or dibutyltin diacetate (see the work by Noll, "Chemistry and Technology of Silicone", page 337, Academic Press, 1968, 2nd edition, or the patents EP 147 323 or EP 235 049). Other possible metal derivatives include chelates, for example dibutyltin acetoacetonate, sulfonates, alcoholates, etc.

Adhesion promoter are largely used in silicone composition. Advantageously, in the process according to the invention it is possible to use one or adhesion promoter chosen in the group consisting of:
alkoxylated organosilanes comprising, per molecule, at least one $C_2$-$C_6$ alkenyl group,
organosilicate compounds comprising at least an epoxy radical
chelates of metal M and/or metallic alkoxydes of formula:

$$M(OJ)_n, \text{ in which}$$

M is chosen in the group consisting of: Ti, Zr, Ge, Li, Mn, Fe, Al and Mg or their mixtures
n=valence of M and J=linear or branched alkyl in $C_1$-$C_8$,
Preferably M is chosen in the group consisting of: Ti, Zr, Ge, Li or Mn, and more preferably M is Titane. It is possible to associate for example an alkoxy radical of butoxy type.

Silicon resins are branched organopolysiloxanes well known and commercially available. They present, in their structure, at least two different units chosen among those of formula $R_3SiO_{1/2}$ (M unit), $R_2SiO_{2/2}$ (D unit), $RSiO_{3/2}$ (T unit) and $SiO_{4/2}$ (Q unit), at least one of these units being a T or Q unit.

Radical R are identical or different and chosen in the group consisting in alkyl linear or branched in C1-C6, hydroxyl, phenyl, trifluoro-3,3,3 propyl. Alkyl radicals are for example methyl, ethyl, isopropyl, tertiobutyl and n-hexyl.

As examples of branched oligomers or organopolysiloxanes polymers, there can be cited MQ resins, MDQ resins, TD resins and MDT resins, the hydroxyl functions can be carried by M, D and/or T units. As examples of resins that are particularly well suited, there can be cited hydroxylated MDQ resin having from 0.2 to 10% by weight of hydroxyl group.

In step 3 the crosslinkable silicone composition X is printed at temperature T1 such as defined above. Temperature T1 should be maintained all over the 3D-printing process to keep the constraint environment.

Printing is preferably carried out layer by layer with a 3D-printer. Advantageously the 3D printer is an extrusion 3D printer.

Advantageously, to maintain constant the temperature T1, the container and the 3D-printer are put into a thermoregulated enclosure.

3D printing is generally associated with a host of related technologies used to fabricate physical objects from computer generated, e.g. computer-aided design (CAD), data sources "3D printer" is defined as "a machine used for 3D printing" and "3D printing" is defined as "the fabrication of objects through the deposition of a material using a print head, nozzle, or another printer technology."

"Printing" is defined as depositing of a material, here a crosslinkable silicone composition X, using a print head, nozzle, or another printer technology.

In this disclosure "3D or three dimensional article, object or part" means an article, object or part obtained by additive manufacturing or 3D printing as disclosed above.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed using a computer-aided design software.

The computer generated data source or program is typically converted into a standard tessellation language (STL) file format; however other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

An extrusion 3D printer is a 3D printer where the material is extruded through a nozzle, syringe or orifice during the manufacturing process. Material extrusion generally works by extruding material through a nozzle, syringe or orifice to print one cross-section of an object, which may be repeated for each subsequent layer. The extruded material bonds to the layer below it during cure of the material.

In one preferred embodiment, the method for manufacturing a three-dimensional silicone elastomer article uses an extrusion 3D printer. Crosslinkable silicone compositions X are extruded through a nozzle. The nozzle may be heated to aid in dispensing the addition crosslinking silicone composition.

The silicone composition X to be dispensed through the nozzle may be supplied from a cartridge-like system. The cartridge may include a nozzle or nozzles with an associated fluid reservoir or fluids reservoirs. It is also possible to use a coaxial two cartridges system with a static mixer and only one nozzle. Pressure will be adapted to the fluid to be dispensed, the associated nozzle average diameter and the printing speed.

Because of the high shear rate occurring during the nozzle extrusion, the viscosity of the crosslinking silicone compositions X is greatly lowered and so permits the printing of fine layers.

Cartridge pressure could vary from 1 (atmospheric pressure) to 28 bars, preferably from 1 to 10 bars and most preferably from 2 to 8 bars. An adapted equipment using aluminum cartridges shall be used to resist such a pressure.

The nozzle and/or build platform moves in the X-Y (horizontal plane) to complete the cross section of the object, before moving in the Z axis (vertical) plane once one layer is complete.

The nozzle has a high XYZ movement precision around 10 µm. After each layer is printed in the X, Y work plane, the nozzle is displaced in the Z direction only far enough that the next layer can be applied in the X, Y work place. In this way, the object which becomes the 3D article is built one layer at a time from the bottom upwards.

The average diameter of the nozzle is related to the thickness of the layer. In an embodiment, the diameter of the layer is comprised from 50 to 2000 µm, preferably from 100 to 800 µm and most preferably from 100 to 500 µm.

Advantageously, printing speed is comprised between 1 and 50 mm/s, preferably between 5 and 30 mm/s to obtain the best compromise between good accuracy and manufacture speed.

Step 4 of the process of the invention is optional and depends among other things on the crosslinkable silicone composition X, the temperature T1 and the type of object that is printed. As mentioned above, the crosslinkable silicone composition X can be a silicone composition crosslinkable through addition reaction or through polycondensation reaction. The skilled person knows that depending on the crosslinkable silicone composition X, the kinetic of the crosslinking step is variable. As known by the skilled person in the field of 3D-printing, the crosslinking begins as soon as the beginning of the printing step and its kinetic depends on the nature of the composition. The objective is to be able to recover the article formed while keeping its shape without any deformation. Thus, in some cases, at the end of step 3, the article can be strong enough to be recovered and the crosslinking if necessary, can be finished later. When step 4 is carried out, the crosslinking can be partial or total as far as it is possible to recover the article while keeping its shape without any deformation. Preferably, step 4 is non-optional.

The crosslinking step 4 can be made by any methods known by the skilled person in function of the crosslinkable silicone composition X used. Thus, the crosslinking step can be done by waiting few minutes or few hours at T1 until crosslinking of the silicone composition X, or by heating at a temperature T2. Temperature T2 depends on the crosslinkable silicone composition X used. This temperature can be determined by the skilled person based on its general knowledge and the information, especially given in the data sheet, regarding the crosslinkable silicone composition X used. Preferably, T2 is comprised between 30 and 90° C., preferably between 40 and 70° C.

Step 5 of the process according to the invention enables to liquefy the gel formed from composition C and thus to recover the silicone elastomer article in step 6 with few amount of gel. This step advantageously enables to recover a great part of composition C which can then be recycled. Temperature T3 can thus be determined by the skilled person based on composition C. Preferably, T3 is lower than 15° C., preferably comprised between 0 and 15° C., preferably between 0 and 10° C.

Preferably, in the process according to the invention:
T1 is comprised between 25 and 50° C., preferably between 25 and 40° C., for example between 25 and 35° C., more preferably between 28 and 32° C., and/or
T3 is lower than 15° C., preferably comprised between 0 and 15° C., preferably between 0 and 10° C.

In a particular embodiment step 5 is absent.

Preferably, when step 5 is absent then step 7 is carried out to eliminate all the gel around the silicone elastomer article recovered at step 6.

Step 5 and 6 can be reversed. Indeed, the silicone elastomer article can be removed and then placed at temperature T3 lower than the sol-gel transition temperature of composition C in order to liquefy the residual gel onto the article.

Advantageously, after steps 5 and 7 composition C is recovered and is recycled in step 1. Composition C can thus be reused at least 30 times.

Advantageously, the use of a poloxamer according to the invention enables to avoid the use of any solvent other than water in the process of the invention. Accordingly, the process of the invention is also preferably characterized in that it does not used solvent other than water. This is of great interest especially for biological and medical uses of the articles obtained.

As mentioned above, the crosslinkable silicone composition X obtained after step 4 can be partially crosslinked. In those cases, a further step of crosslinking is carried out at the end of the process, after step 6 or 7. This further crosslinking step can be carried out by any means known by the skilled person in function of the crosslinkable silicone composition X used. It can for example carried out by heating, for example between 100 and 250° C., or under UV irradiation between 50 and 240 W/cm for Mercury arc lamps or with LED having irradiance higher than 15 mW/cm$^2$.

Optionally, the resulting articles may be subjected to different post-processing regimes. In an embodiment, the method further comprises the step of heating the three-dimensional silicone article. Heating can be used to expedite cure. In another embodiment, the method further comprises the step of further irradiating the three-dimensional silicone article. Further irradiation can be used to expedite cure. In another embodiment, the method further comprises both steps of heating and irradiating the three-dimensional silicone article. Optionally, post-processing steps can greatly improve the surface quality of the printed articles. Sanding is a common way to reduce or remove the visibly distinct layers of the model. Spraying or coating the surface of the elastomer article with a heat or UV curable RTV or LSR silicone composition can be used to get the right smooth surface aspect.

A surfacing treatment with a laser can also be done.

For medical applications, a sterilization of the final elastomer article can be obtained for example: by heating either in a dry atmosphere or in an autoclave with vapor, for example by heating the object at a temperature greater than 100° C., under gamma ray, sterilization with ethylene oxide, sterilization with an electron beam.

The present invention also related to the silicone elastomer article obtained or susceptible to be obtained by the process according to the invention. The article can be any article with simple or complex geometry. It can be for example anatomic models (functional or non functional) such as heart, lumb, kidney, prostate . . . models for surgeons and educative world or orthotics or prostheses or even implants of different classes such as long term implants: hearing aids, stents, larynx implants, etc.

The present invention also relates to the use of a composition C according to the invention as a constrained environment for manufacturing a silicone elastomer article with a 3D printer.

The present invention will now be disclosed by means of the following non-limiting examples.

EXAMPLES

Steps 1 and 2: Preparation of Compositions C

Composition C1: 21.75 weight % of Pluronic F127® (BASF) was dissolved in water. The composition is placed in a container which is placed at 30° C. (T1) to form a gel.

Composition C2: 21.75 weight % of Pluronic F127® (BASF) was dissolved in 10M NaOH aqueous solution (pH>8). The composition is placed in a container which is placed at 30° C. (T1) to form a gel.

Preparation of Crosslinkable Silicone Compositions X
Preparation of Composition X1 (Viscosity 2000 mPa·s at 25° C./Shear 0.5 s$^{-1}$):

Composition X1 is a bicomponent composition which comprises a first part A and a second part B, as follow:

Part A
    28.57 parts dimethylpolysiloxane oil blocked at both ends by Me$_2$ViSiO$_{1/2}$ units, having a viscosity of 600 mPa·s
    5 parts of a dimethylpolysiloxane blocked at both ends by Me$_2$ViSiO$_{1/2}$ units, having a viscosity of 100000 mPa·s
    6.42 parts of silica fumed treated hexamethyldisilazane with a specific surface area measured by the BET method of 200 m$^2$/g
    10 parts of dimethylsiloxane oil blocked at both ends by Me$_3$SiO$_{1/2}$ units, having a viscosity of 50 mPa·s
    Platinum metal introduced in the form of an Organometallic complex at 10% by weight of Platinum metal, known as Karstedt's catalyst diluted in a vinyl oil such as the Pt content of the composition is 10 ppm in part A Part B:
    17.57 parts dimethylpolysiloxane oil blocked at both ends by Me$_2$ViSiO$_{1/2}$ units, having a viscosity of 600 mPa·s
    5 parts of a dimethylpolysiloxane blocked at both ends by Me$_2$ViSiO$_{1/2}$ units, having a viscosity of 100000 mPa·s
    6.42 parts of silica fumed treated hexamethyldisilazane with a specific surface area measured by the BET method of 200 m$^2$/g
    10 parts of dimethylsiloxane oil blocked at both ends by Me$_3$SiO$_{1/2}$ units, having a viscosity of 50 mPa·s
    11 parts of an organohydrogenopolysiloxane comprising Si—H groups in the chain and at chain ends and containing approximately 18.75% molar groups Si—H
    0.005 parts of tetramethyltetravinylcyclotetrasiloxane Preparation of Composition X2 (Viscosity >150000 mPa·s; 25° C. Shear 0.55):

Composition X2 is a monocomponent composition with is prepared as follows.

A first base is prepared by mixing:
- 29 parts dimethylpolysiloxane oil blocked at both ends by $Me_2ViSiO_{1/2}$ units, having a viscosity of 60000 mPa·s
- 29 parts of a dimethylpolysiloxane blocked at both ends by $Me_2ViSiO_{1/2}$ units, having a viscosity of 100000 mPa·s
- 26 parts of silica fumed with a specific surface area measured by the BET method of 300 m2/g and
- 7 parts of hexamethyldisilazane.

This first base is heated at 70° C. under agitation for 1 hour and then devolatilised, cooled and stored as a base.

Then a part A composition is prepared by adding to 45 parts of this base in a speed mixer:
- Platinum metal which is introduced in the form of an Organometallic complex at 10% by weight of Platinum metal, known as Karstedt's catalyst diluted in a vinyl oil.
- 3 parts: dimethylpolysiloxane oil having vinyl groups in the chain and at the chain ends and having a viscosity of 1000 mPa·s
- 2 parts of a dimethylpolysiloxane oil having vinyl groups in the chain and at the chain ends and having a viscosity of 400 mPa·s The resulting part A composition is mixed during one minute at 1000 rounds/minute in the speed mixer. The Pt content of this part A composition is 5 ppm Then a part B is prepared by adding to 45 parts of the base is then added in a speed mixer:
- 1.3 parts of an organohydrogenopolysiloxane M'Q resin comprising Si—H groups
- 0.5 parts of an organohydrogenopolysiloxane comprising Si—H groups in the chain and at chain ends and containing approximately 20% by weight of groups Si—H
- 1.5 parts of a dimethylpolysiloxane oil having vinyl groups in the chain and at the chain ends and having a viscosity of 400 mPa·s
- 1.6 parts: dimethylpolysiloxane oil having vinyl groups in the chain and at the chain ends and having a viscosity of 1000 mPa·s and
- 0.08 parts of ethynyl-1-cyclohexanol-1 as crosslinking inhibitor The resulting part B is mixed during one minute at 1000 rounds/minute in the speed mixer.

Composition X2 is then obtained by mixing 50 parts of part A and 50 parts of part B during one minute at 1000 rounds/minute in the speed mixer. The bath life of this composition X2 at 25° C. is greater than 24 hours and lower than 48 hours.

Preparation of Composition X3 (Viscosity >150000 mPa·s; 25° C. Shear 0.55:

Composition X3 is a monocomponent composition and is prepared by mixing at ambient temperature:
- 76.5 parts dimethylpolysiloxane oil blocked at both ends by $Me_2(OH)SiO_{1/2}$ units, having a viscosity of 80000 mPa·s
- 9.2 parts of a MDT resin with a molar ratio $Me_3SiO_{1/2}$ 4%; $Me_2SiO_{2/2}$ 70%; $MeSiO_{3/2}$ 26%
- 10.7 parts of silica fumed with a specific surface area measured by the BET method of 55 m2/g
- 2.9 Parts of methyltriacetoxysilane as crosslinker
- 0.7 parts of ethyltriacetoxysilane as crosslinker
- 0.0036 parts of titanatetetrabutoxyde as catalyst.

Example 1: Steps 3, 4, 6 and 7 Carried Out with Composition C1 and Composition X1

Step 3:
Part A and part B of composition X1 with viscosity 2000 mPa·s are extruded through the double cartridge Equalizer™ from Nordson EFD (bicomponent system bath life after mixing Part A and Part B 20 min at 20° C.) through a static mixer and a nozzle with a strand diameter of 400 μm, at a rate between 0.1 to 5 ml/s in in composition C1 at 30° C. micro-gel to produce layer by layer a 3D article.

Step 4:
After printing, the silicone composition X1 is crosslinked by placing the container at 60° C. during 2 h.

Step 6:
The silicone elastomer article is then removed from the composition C1.

Step 7:
The recovered silicone elastomer article is washed with cold water at 10° C. for 5 minutes.

The mechanical properties of the 3D printed silicone elastomer article are in good fit with the mechanical properties claimed for a molded silicone article obtained from composition X1.

Dumbbell samples are prepared.

The shore A hardness according ASTM-D2240/C is 3. Such article can be used for dental applications.

Example 2: Steps 3 to 7 Carried Out with Composition C1 and Composition X2

Step 3:
Composition X2 with viscosity >150000 mPa·s is extruded through the single cartridge Ultimus V Nordson EFD equipment (monocomponent system) at a flow rate between 0.01 and 1 ml/s through a nozzle with a strand diameter of 400 μm in composition C1 at 30° C. to produce layer by layer a 3D article.

Step 4:
After printing, the silicone composition X2 is crosslinked by placing the container at 70° C. during 1 h.

Step 5:
The composition C1 which forms a gel at 30° C., is placed at 10° C. in order to liquefy the gel. The liquefied gel obtained is used for another printing process according to the invention without loss of properties.

Step 6:
The silicone elastomer article is then removed from the composition C1.

Step 7:
The recovered silicone elastomer article is washed with cold water at 10° C. for 5 minutes.

Additional Crosslinking Step
Then the object is further crosslinked at 120° C. during 2 h.

The mechanical properties of the printed objects are in good fit with the mechanical properties claimed for a molded object obtained from composition X2.

Dumbbell samples are prepared (a sample obtained by the printing process according to the invention and a molded object with same composition X2 obtained by molding) and the results obtained regarding mechanical properties on a 2 mm thick film (NF T 46002) are the following:
- Hardness ASTM D2240: printed sample 50/Injection Molded sample 50
- Tensile Strength ASTM-D412: Printed sample 7.6 MPa/ Injection-Molded sample 8.4 MPa Elongation ASTM-D412: Printed sample 490%/Injection molded sample 530%

Modulus 100% ASTM-D412: Printed sample 2.3 MPa/Injection Molded sample 2.3 MPa

Example 3—Steps 3, 6 and 7 Carried Out with Composition C1 and Composition X3

Step 3:

Composition X3 with viscosity >150000 mPa·s is extruded (Ultimus Nordson) at a flow rate between 0.1 to 5 ml/s through a nozzle with a strand diameter of 400 μm in composition C1 at 30° C. to produce layer by layer a 3D article.

Step 6:

After printing the silicone elastomer article is removed from the composition C1.

Step 7:

The recovered silicone elastomer article is washed with cold water at 10° C. for 5 minutes.

The mechanical properties (after 48 hours at room temperature) of the printed objects are in good fit with the mechanical properties claimed for a molded object obtained from composition X3.

Dumbbell sample are prepared according to the invention and also molded object obtained from composition X3. Mechanical properties on a 2 mm thick film (NF T 46002) (dumbbell sample) at a temperature of 23° C. and relative humidity of 50%, are the followings:

Tensile Strength ASTM-D412: Printed sample 1.8 MPa/Molded sample 1.9 MPa

Elongation at break ASTM-D412: Printed sample 600%/Molded sample 500%

Modulus 100% ASTM-D412: Printed sample 0.45 MPa/Molded sample 0.5 MPa

Shore A Hardness (ISO 868): Printed sample at 20/Molded sample at 23

Example 4—Steps 3, 4, 6 and 7 Carried Out with Composition C2 and Composition X2

Step 3:

Composition X2 with viscosity >150000 mPa·s is extruded through the single cartridge Ultimus V Nordson EFD equipment (monocomponent system) at a flow rate between 0.01 and 1 ml/s through a nozzle with a strand diameter of 400 μm in composition C2 at 30° C. to produce layer by layer a 3D article.

Step 4:

The printed composition X2 obtained in step 3) is let during 10-24 hours in composition C2 at 30° C.

Step 6

After printing the silicone elastomer article is removed from the composition C2.

Step 7:

The recovered silicone elastomer article is washed with cold water at 10° C. for 5 minutes.

Example 5—Steps 3, 6 and 7 Carried Out with Composition C2 and Composition X2

Step 3:

Composition X2 with viscosity >150000 mPa·s is extruded through the single cartridge Ultimus V Nordson EFD equipment (monocomponent system) at a flow rate between 0.01 and 1 ml/s through a nozzle with a strand diameter of 400 μm in composition C2 at 30° C. to produce layer by layer a 3D article.

Step 6

After printing the silicone elastomer article is removed from the composition C2.

Step 7:

The recovered silicone elastomer article is washed with cold water at 10° C. for 5 minutes.

The invention claimed is:

1. A method for manufacturing a silicone elastomer article comprising:
   1) providing a composition C, comprising water and at least 20% by weight of at least one poloxamer, into a container;
   2) placing the container comprising the composition C at a required temperature T1 to form a gel;
   3) printing a crosslinkable silicone composition X into the gel obtained in 2) with a 3D printer at the required temperature T1;
   4) allowing the printed composition X to partially or totally crosslink, by heating at a temperature between 30° C. and 90° C. to obtain a silicone elastomer article, in the container;
   5) placing the container obtained in 4) at a temperature T3 lower than the sol-gel transition temperature of composition C;
   6) after 5), recovering the silicone elastomer article; and
   7) optionally washing the obtained silicone elastomer article for example with water at the temperature T3 lower than the sol-gel transition temperature of composition C;
   wherein after 5), composition C is recovered in a reusable form and is recycled in 1).

2. The method according to claim 1 wherein the poloxamer is a copolymer composed of poly(propylene oxide) and poly(ethylene oxide) blocks.

3. The method according to claim 1 wherein the poloxamer is a triblock copolymer composed of a central poly(propylene oxide) block and two terminal poly(ethylene oxide) blocks.

4. The method according to claim 1, wherein the poloxamer comprises from 25 to 90% by weight of poly(ethylene oxide) units based on the total weight of the poloxamer.

5. The method according to claim 1, wherein the poloxamer is a triblock copolymer composed of a central poly(propylene oxide) block and two terminal poly(ethylene oxide) block for which the two poly(ethylene oxide) block comprise each 100+/−10 repeat units and the poly(propylene oxide) block comprises 55+/−10 repeat units.

6. The method according to claim 1 wherein composition C comprises from 20 to 40% by weight of at least one poloxamer.

7. The method according to claim 1, wherein the composition C further comprises one or more compounds chosen from the group consisting of:
   a base;
   an acid; and
   a functionalized silane.

8. The method according to claim 7, wherein the base is NaOH, and wherein the acid is acetic acid.

9. The method according to claim 7, wherein the functionalized silane is functionalized with a moiety selected from the group consisting of amino, epoxy, hydroxy, and polyether groups.

10. The method according to claim 1 wherein:
T1 is comprised between 25 and 50° C., and/or
T3 is lower than 15° C.

11. The method according to claim 10 wherein:
T1 is comprised between 25 and 35° C., and/or
T3 is comprised between 0 and 10° C.

12. The method according to claim 10 wherein:
T1 is comprised between 25 and 40° C., and/or
T3 is comprised between 0 and 15° C.

13. The method according to claim 1, wherein 5) and 6) are reversed.

14. The method according to claim 1, wherein composition C comprises from 21.5 to 22.5% by weight of poloxamer based on the total weight of composition C.

15. The method according to claim 1, wherein the cross-linkable composition X has a viscosity comprised between 1000 mPa·s and 1000000 mPa·s.

16. The method for manufacturing a silicone elastomer article according to claim 1, wherein the silicone elastomer article is manufactured using a 3D printer.

17. The method according to claim 1, wherein the cross-linking is made by heating at a temperature between 40 and 70° C.

* * * * *